UNITED STATES PATENT OFFICE.

HENRY D. BODDINGTON, OF LOS ANGELES, CALIFORNIA.

FOOD COMPOSITION FOR MAKING CAKES AND THE LIKE.

1,266,202.　　　　　　Specification of Letters Patent.　　Patented May 14, 1918.

No Drawing.　　　Application filed October 26, 1917.　Serial No. 198,693.

*To all whom it may concern:*

Be it known that I, HENRY D. BODDINGTON, a subject of the King of Great Britain, residing at Los Angeles, in the county of Los Angeles and State of California, have invented new and useful Improvements in Food Compositions for Making Cakes and the like, of which the following is a specification.

My invention relates to a food compound for making cakes and the like.

It is the object of this invention to provide a composition in the form of a dry powder, which combines a superior baking powder with highly nutritious material especially adapted for making cakes and the like, so that it will be necessary only to add the proper proportion of flour and water with shortening as desired to make a cake or the like.

My invention consists in the composition hereinafter described and claimed.

In the compounding of my composition, I take the following ingredients, the parts being by weight:

| | |
|---|---|
| Bicarbonate of soda | 25 parts |
| Tartaric acid | 9 " |
| Cream of tartar | 16 " |
| Rice or cornstarch | 40 " |
| Pulverized egg yolk | 6 " |
| Casein | 6 " |
| Vanilla extract | 1 oz. |
| Carrotin | 3 " |

The above named ingredients are compounded as follows: The bicarbonate of soda, tartaric acid and cream of tartar are each thoroughly and separately dried at a temperature of 100° F. The bicarbonate of soda and the rice or cornstarch are milled for fifteen minutes in a pebble mill, or the like, then the pulverized egg yolk and the casein are added and the mixture is milled again for fifteen minutes. The tartaric acid and cream of tartar are now added, together with the vanilla and carrotin, and the mixture is milled for about two hours and immediately thereafter put up in air-tight containers.

The casein used in the above compound is perferably prepared by precipitating the same from skimmed milk by means of a suitable acid.

A variation of the above compound is prepared as follows:

18¾ lbs. of casein are carefully dried and mixed with 7½ lbs. of 85% of phosphoric acid. The mixture is dried and fed to the mill and ground until fine and homogeneous. Now 25 lbs. of bicarbonate of soda and 45 lbs. of rice or corn starch are added, and the mixture is ground for fifteen minutes, and 6 lbs. of pulverized egg yolk, 1 ounce of vanilla extract, 3 ounces of vegetable coloring matter, consisting of carrotin, annatto, or tumeric, separately or combined, are added, and the mixture is ground for two hours and immediately thereafter put up in air-tight containers.

While best results are obtained by following directions and the proportions given rather closely, it will be understood by those skilled in the art that good results will follow even where the proportions are changed, and I do not limit myself to the exact proportions of the ingredients as stated.

I claim:

1. A food compound containing bicarbonate of soda, tartaric acid, cream of tartar, starch, egg yolk, and casein.

2. A food compound containing bicarbonate of soda 25 parts, tartaric acid 9 parts, cream of tartar 16 parts, starch 40 parts, egg yolk 6 parts, and casein 6 parts.

In testimony whereof I have signed my name to this specification.

HENRY D. BODDINGTON.